United States Patent

Sunagawa

[11] Patent Number: 5,990,921
[45] Date of Patent: Nov. 23, 1999

[54] IMAGE-WISE EXPOSURE APPARATUS, MIRROR ARRAY DEVICE, AND LIQUID CRYSTAL PANEL

[75] Inventor: Hiroshi Sunagawa, Kanagawa, Japan

[73] Assignee: Fuji Photo Film Co., LTD, Kanagawa-ken, Japan

[21] Appl. No.: 08/807,401

[22] Filed: Feb. 27, 1997

[30] Foreign Application Priority Data

Feb. 27, 1996 [JP] Japan .................................... 8-039489
May 30, 1996 [JP] Japan .................................... 8-136767

[51] Int. Cl.$^6$ .................................................... G01D 15/14
[52] U.S. Cl. .................................................... 347/239
[58] Field of Search .................................... 347/239, 241

[56] References Cited

U.S. PATENT DOCUMENTS 3,650,605   3/1972   Little, Jr. .................................... 359/15
4,675,702   6/1987   Gerber ................................ 347/239 X
4,743,927   5/1988   Sasaki ..................................... 347/130

*Primary Examiner*—N. Le
*Assistant Examiner*—Michael Nghiem
*Attorney, Agent, or Firm*—Sughrue, Mion, Zinn, Macpeak & Seas, PLLC

[57] ABSTRACT

An image-wise exposure apparatus includes a mirror array device comprising a plurality of small mirrors which are two-dimensionally arrayed in two directions normal to each other and a drive mechanism for changing the orientations of the respective small mirrors independently from each other so that light impinging upon each of the small mirrors is reflected selectively in one of a first direction in which the reflected light impinges upon the photosensitive material and a second direction in which the reflected light does not impinge upon the photosensitive material. A control circuit controls the drive mechanism according to an image signal. In the image-wise exposure apparatus, picture element shifting is carried out. There is provided an antireflective mask which limits the effective aperture of each small mirror to a continuous region not longer than 1.5 a/m as measured in a direction in which the picture element shifting operation is carried out, wherein a represents the mirror pitches in the direction of the picture element shifting and m represents the times by which the number of exposure dots are multiplied by the picture element shifting in the direction.

10 Claims, 8 Drawing Sheets

IMAGE-WISE EXPOSURE APPARATUS, MIRROR ARRAY DEVICE, AND LIQUID CRYSTAL PANEL

BACKGROUND OF THE INVENTION

1. Field of the Invention

This invention relates to an image-wise exposure apparatus, wherein a photosensitive material is exposed image-wise by use of a mirror array device, a liquid crystal panel or the like, and more particularly to such an image-wise exposure apparatus, wherein a picture element shifting operation is carried out so that a high resolution image can be obtained on the photosensitive material.

Further this invention relates to a mirror array device and a liquid crystal panel for use in such an image-wise exposure apparatus.

2. Description of the Related Art

As described, for instance, in "O plus E" magazine, the October issue, 1994, pp. 90–94, there has been known a mirror array device comprising a plurality of small mirrors which are arranged in the form of a two-dimensional array, and a drive means for changing the orientations of the respective small mirrors independently from each other so that light impinging upon each of the small mirrors is reflected selectively toward one of two directions.

With such a mirror array device, an image can be projected onto a predetermined projection surface via the mirror array device while modulating the light impinging upon the projection surface for each of the small mirrors by controlling the drive means according to an image signal. When a photosensitive material is located on the projection surface, the photosensitive material can be exposed image-wise. Further the amount of light impinging upon the photosensitive material can be controlled for each of the small mirrors by, for instance, pulse width modulation of the "on" time of each small mirror (i.e., the time each smaller mirror is set in the orientation in which the light is caused to impinge upon the photosensitive material) within a frame time, whereby a gradation image can be formed on the photosensitive material.

In such a mirror array device, when large gaps exist between the small mirrors each of which forms one picture element, light travelling through the gaps is scattered by the base plate which supports the small mirrors or by mirror drive elements on the base plate. The scattered light can reach the plane on which an image is formed by the light reflected by the small mirrors and deteriorates the extinction ratio.

In order to avoid such a problem, it is ideal that the small mirrors are arranged very close to each other, that is, the mirror pitches are substantially equal to the mirror lengths in both the longitudinal direction and the transverse direction and the mirror aperture is almost 100%. Accordingly, in a mirror array device for use in an image-wise projection, there have been made attempts to make the mirror aperture as large as possible (e.g., not smaller than 85%) by forming each of the small mirrors to be sufficiently large to be close to adjacent mirrors.

Further, it has been proposed to utilize, when a photosensitive material is to be exposed image-wise by use of a spatial modulation device such as a liquid crystal panel, a so-called "picture element shifting" in order to increase the density of picture elements of the formed image, thereby obtaining a high resolution image. As described, for instance, in Japanese Unexamined Patent Publication No. 4(1992)-7542, with the picture element shifting, the optical relationship between the spatial modulation device and the photosensitive material is changed so that, after exposure dots have been formed on the photosensitive material by the light from the picture elements of the spatial modulation device (e.g., liquid crystal cells in the case of a liquid crystal panel), exposure dots may be further formed between adjacent exposure dots by the light from the picture elements of the spatial modulation device. The image-wise exposure is carried out each time the optical relationship is changed.

As for the image formed by the image-wise exposure, the aforesaid exposure dots constitute the picture elements of the formed image. However in this specification, in order to discriminate the picture elements of the formed image from the picture elements of the spatial modulation device, the picture elements of the formed image will be referred to as the exposure dots unless otherwise specified.

For example, when the spatial modulation device comprises (i)×(j) number of picture elements arrayed along X and Y directions and the picture element shifting operation is carried out once along the X direction and once along the Y direction, 2i number of exposure dots and 2j number of exposure dots are recorded on the photosensitive material respectively along the X and Y directions thereof. That is, in this case, exposure dots which are the same in number as the exposure dots which can be recorded by one image-wise exposure using a spatial modulation device having 4×(i×j) number of picture elements can be recorded, whereby the resolution of the image formed on the photosensitive material can be increased.

The relationship between the spatial modulation device and the photosensitive material may be changed, for instance, by moving the spatial modulation device, the photosensitive material or an optical element between the spatial modulation device and the photosensitive material.

Generally in the case of a spatial modulation device such as a liquid crystal panel, it is difficult to integrate a large number of picture elements at a high density. However when the aforesaid picture element shifting is employed, a high-density image can be formed by image-wise exposure using a spatial modulation device having a relatively small number of picture elements arrayed at a relatively low density.

The picture element shifting operation can be carried out in an image-wise exposure apparatus comprising a mirror array device. However when the picture element shifting operation is carried out in an image-wise exposure apparatus comprising a conventional mirror array device, the sharpness of images formed on the photosensitive material deteriorates.

Further there has been known an image-wise exposure apparatus in which a gradation image displayed on a liquid crystal panel is recorded on a photosensitive material. Also in such an image-wise exposure apparatus, the sharpness of images formed on the photosensitive material deteriorates when the picture element shifting operation is carried out.

SUMMARY OF THE INVENTION

In view of the foregoing observations and description, the primary object of the present invention is to provide an image-wise exposure apparatus using a mirror array device in which a sufficiently sharp image can be formed on a photosensitive material even if the picture element shifting operation is carried out.

Another object of the present invention is to provide an image-wise exposure apparatus using a liquid crystal panel in which a sufficiently sharp image can be formed on a photosensitive material even if the picture element shifting operation is carried out.

Still another object of the present invention is to provide a mirror array device and a liquid crystal panel which make it feasible to form a sufficiently sharp image on a photosensitive material even if the picture element shifting operation is carried out.

In accordance with a first aspect of the present invention, there is provided an image-wise exposure apparatus comprising a light source for emitting recording light to which a photosensitive material is exposed, a mirror array device comprising a plurality of small mirrors which are two-dimensionally arrayed in two directions normal to each other, and a drive mechanism for changing the orientations of the respective small mirrors independently from each other so that light impinging upon each of the small mirrors is reflected selectively in one of a first direction in which the reflected light impinges upon the photosensitive material and a second direction in which the reflected light does not impinge upon the photosensitive material, a control circuit which controls the drive mechanism according to an image signal, and a means for carrying out the aforesaid picture element shifting, wherein the size of each of the small mirrors is sufficiently close to the mirror pitches in both the directions in which the small mirrors are arrayed, and there is provided an antireflective (i.e., light absorbing and/or light scattering) mask which limits the effective aperture of each small mirror to a continuous region not longer than 1.5 a/m as measured in a direction in which the picture element shifting operation is carried out, wherein $\underline{a}$ represents the mirror pitches in the direction of the picture element shifting and $\underline{m}$ represents the times by which the number of exposure dots are multiplied by the picture element shifting in the direction.

The times $\underline{m}$ is 2 when the picture element shifting is carried out once, and 3 when the picture element shifting is carried out twice, and increases by one for each increase by one in the number of times of the picture element shifting.

The antireflective mask may be provided one for each small mirror or may be provided for all the small mirrors by disposing a transparent member in front of the mirror array device and bonding a mask pattern on the transparent member.

In accordance with a second aspect of the present invention, there is provided an image-wise exposure apparatus comprising a light source, a mirror array device, a control circuit and a means for carrying out the picture element shifting which are similar to those employed in the image-wise exposure apparatus in accordance with the first aspect, wherein the size of each of the small mirrors is sufficiently close to the mirror pitches in both the directions in which the small mirrors are arrayed, and the distribution of the reflectance of each small mirror is such that the reflectance of the small mirror is not smaller than a predetermined value only in a continuous region not longer than 1.5 a/m as measured in a direction in which the picture element shifting operation is carried out, wherein a represents the mirror pitches in the direction of the picture element shifting and $\underline{m}$ represents the times by which the number of exposure dots are multiplied by the picture element shifting in the direction.

In one embodiment, the reflectance of each small mirror shows Gaussian distribution where the reflectance is maximized substantially at the center of the small mirror and said predetermined value is about $1/e^2$ of the maximum value of the reflectance.

In accordance with a third aspect of the present invention, there is provided an image-wise exposure apparatus comprising a light source, a mirror array device, a control circuit and a means for carrying out the picture element shifting which are similar to those employed in the image-wise exposure apparatus in accordance with the first aspect, wherein the size of each of the small mirrors is sufficiently close to the mirror pitches in both the directions in which the small mirrors are arrayed, and each small mirror is chamfered so that light reflected at a portion of the small mirror outside a predetermined region cannot impinge upon the photosensitive material in any position of the small mirror the small mirror can take, the predetermined position being a continuous region not longer than 1.5 a/m as measured in a direction in which the picture element shifting operation is carried out, wherein $\underline{a}$ represents the mirror pitches in the direction of the picture element shifting and $\underline{m}$ represents the times by which the number of exposure dots are multiplied by the picture element shifting in the direction.

In any one of the preceding arrangements, it is preferred that said continuous region be not shorter than a/m.

Further in any one of the preceding arrangements, it is preferred that the means for carrying out the picture element shifting carries out the picture element shifting in both the directions in which the small mirrors are arrayed and which are normal to each other.

In accordance with a fourth aspect of the present invention, there is provided an image-wise exposure apparatus comprising a light source for emitting recording light to which a photosensitive material is exposed, a liquid crystal panel comprising a plurality of liquid crystal cells which are two-dimensionally arrayed in two directions in positions where the liquid crystal cells receive the recording light and a drive mechanism which drives the liquid crystal cells independently from each other to change the transmittance or the reflectance of each liquid crystal cell, thereby controlling impingement of the recording light upon the photosensitive material, a control circuit which controls the drive mechanism according to an image signal, and a picture element shifting means which changes the optical relationship between the liquid crystal panel and the photosensitive material to a second relationship after exposure of the photosensitive material to the recording light from the liquid crystal cells with the liquid crystal panel and the photosensitive material in a first relationship so that exposure dots are formed by exposure of the photosensitive material to the recording light from the liquid crystal cells with the liquid crystal panel and the photosensitive material in the second relationship between adjacent exposure dots formed by exposure of the photosensitive material to the recording light from the liquid crystal cells with the liquid crystal panel and the photosensitive material in the first relationship, wherein an antireflective mask which limits the effective aperture of each liquid crystal cell to a continuous region not longer than 1.5 a/m as measured in a direction in which the picture element shifting operation is carried out, wherein a represents the liquid crystal cell pitches in the direction of the picture element shifting and m represents the times by which the number of exposure dots are multiplied by the picture element shifting in the direction.

In accordance with a fifth aspect of the present invention, there is provided an image-wise exposure apparatus comprising a light source, a liquid crystal panel, a control circuit and a picture element shifting means which are similar to those employed in the image-wise exposure apparatus in accordance with the fourth aspect, wherein the distribution of the transmittance or reflectance of each liquid crystal cell is such that the transmittance or reflectance of the liquid crystal cell is not smaller than a predetermined value only in a continuous region not longer than 1.5 a/m as measured in a direction in which the picture element shifting operation is carried out, wherein a represents the liquid crystal cell pitches in the direction of the picture element shifting and m represents the times by which the number of exposure dots are multiplied by the picture element shifting in the direction.

In one embodiment, the transmittance or reflectance of each liquid crystal cell shows Gaussian distribution where the transmittance or reflectance is maximized substantially at the center of the liquid crystal cell and said predetermined value is about $1/e^2$ of the maximum value of the transmittance or reflectance.

In either of the arrangements in accordance with the fourth and fifth aspect of the present invention, it is preferred that said continuous region be not shorter than a/m.

Further, it is preferred that the picture element shifting means carries out the picture element shifting in both the directions in which the liquid crystal cells are arrayed and which are normal to each other.

In accordance with a sixth aspect of the present invention, there is provided a mirror array device comprising a plurality of small mirrors which are two-dimensionally arrayed in positions where the small mirrors receive the recording light emitted from an image-wise exposure apparatus where picture element shifting is carried out and a drive mechanism for changing the orientations of the respective small mirrors independently from each other so that light impinging upon each of the small mirrors is reflected selectively in one of a first direction in which the reflected light impinges upon a photosensitive material and a second direction in which the reflected light does not impinge upon the photosensitive material, wherein the size of each of the small mirrors is sufficiently close to the mirror pitches in both the directions in which the small mirrors are arrayed, and there is provided an antireflective mask which limits the effective aperture of each small mirror to a continuous region not longer than 1.5 a/m as measured in a direction in which the picture element shifting operation is carried out, wherein a represents the mirror pitches in the direction of the picture element shifting and m represents the times by which the number of exposure dots are multiplied by the picture element shifting in the direction.

In accordance with a seventh aspect of the present invention, there is provided a mirror array device comprising a plurality of small mirrors which are two-dimensionally arrayed in positions where the small mirrors receive the recording light emitted from an image-wise exposure apparatus where picture element shifting is carried out and a drive mechanism for changing the orientations of the respective small mirrors independently from each other so that light impinging upon each of the small mirrors is reflected selectively in one of a first direction in which the reflected light impinges upon a photosensitive material and a second direction in which the reflected light does not impinge upon the photosensitive material, wherein the size of each of the small mirrors is sufficiently close to the mirror pitches in both the directions in which the small mirrors are arrayed, and the distribution of the reflectance of each small mirror is such that the reflectance of the small mirror is not smaller than a predetermined value only in a continuous region not longer than 1.5 a/m as measured in a direction in which the picture element shifting operation is carried out, wherein a represents the mirror pitches in the direction of the picture element shifting and m represents the times by which the number of exposure dots are multiplied by the picture element shifting in the direction.

In one embodiment, the reflectance of each small mirror shows Gaussian distribution where the reflectance is maximized substantially at the center of the small mirror and said predetermined value is about $1/e^2$ of the maximum value of the reflectance.

In accordance with an eighth aspect of the present invention, there is provided a mirror array device comprising a plurality of small mirrors which are two-dimensionally arrayed in positions where the small mirrors receive the recording light emitted from an image-wise exposure apparatus where picture element shifting is carried out and a drive mechanism for changing the orientations of the respective small mirrors independently from each other so that light impinging upon each of the small mirrors is reflected selectively in one of a first direction in which the reflected light impinges upon a photosensitive material and a second direction in which the reflected light does not impinge upon the photosensitive material, wherein the size of each of the small mirrors is sufficiently close to the mirror pitches in both the directions in which the small mirrors are arrayed, and each small mirror is chamfered so that light reflected at a portion of the small mirror outside a predetermined region cannot impinge upon the photosensitive material in any position of the small mirror the small mirror can take, the predetermined position being a continuous region not longer than 1.5 a/m as measured in a direction in which the picture element shifting operation is carried out, wherein a represents the mirror pitches in the direction of the picture element shifting and m represents the times by which the number of exposure dots are multiplied by the picture element shifting in the direction.

It is preferred that said continuous region be not shorter than a/m.

In accordance with a ninth aspect of the present invention, there is provided a liquid crystal panel comprising a plurality of liquid crystal cells which are two-dimensionally arrayed in two directions in positions where the liquid crystal cells receive the recording light emitted from an image-wise exposure apparatus where picture element shifting is carried out and a drive mechanism which drives the liquid crystal cells independently from each other to change the transmittance or the reflectance of each liquid crystal cell, thereby controlling impingement of the recording light upon a photosensitive material, wherein an antireflective mask which limits the effective aperture of each liquid crystal cell to a continuous region not longer than 1.5 a/m as measured in a direction in which the picture element shifting operation is carried out, wherein a represents the liquid crystal cell pitches in the direction of the picture element shifting and m represents the times by which the number of exposure dots are multiplied by the picture element shifting in the direction.

In accordance with a tenth aspect of the present invention, there is provided a liquid crystal panel comprising a plurality of liquid crystal cells which are two-dimensionally arrayed in two directions in positions where the liquid crystal cells receive the recording light emitted from an image-wise exposure apparatus where picture element shifting is carried out and a drive mechanism which drives the liquid crystal cells independently from each other to change the transmittance or the reflectance of each liquid crystal cell, thereby controlling impingement of the recording light upon a photosensitive material, wherein the distribution of the transmittance or reflectance of each liquid crystal cell is such that the transmittance or reflectance of the liquid crystal cell is not smaller than a predetermined value only in a continuous region not longer than 1.5 a/m as measured in a direction in which the picture element shifting operation is carried out, wherein a represents the liquid crystal cell pitches in the direction of the picture element shifting and m represents the times by which the number of exposure dots are multiplied by the picture element shifting in the direction.

In one embodiment, the transmittance or reflectance of each liquid crystal cell shows Gaussian distribution where the transmittance or reflectance is maximized substantially at the center of the liquid crystal cell and said predetermined value is about $1/e^2$ of the maximum value of the transmittance or reflectance.

It is preferred that said continuous region be not shorter than a/m.

Our investigation has revealed that the aforesaid problem that the sharpness of images formed on the photosensitive material deteriorates when the picture element shifting operation is carried out in an image-wise exposure apparatus comprising a conventional mirror array device is due to the fact that the conventional mirror array device has an increased mirror aperture in order to avoid adverse influence of scattered light. This will be described in detail hereinbelow.

FIG. 9 shows a result of the investigation where image-wise exposure was carried out using a linear array of small mirrors at 17 μm pitches and carrying out picture element shifting once in the direction of array of the small mirrors and MTF was detected. MTF was obtained in the case where the mirror array device was projected onto a photosensitive material through an optical system having a magnification of ×11.8 so that the mirror pitches on the photosensitive material were 200 μm. The values shown in FIGS. 10A to 10C are also those measured on the photosensitive material.

That the picture element shifting is carried out once means that exposure is carried out twice with the mirror array device and the photosensitive material in different optical relationships, and accordingly the number of exposure dots doubles. Further since the exposure dots formed by the two exposures are at regular pitches, the picture element shifting (shifting of mirror array device) is carried out at pitches of 100 μm as measured on the photosensitive material.

The investigation was made using three kinds of mirror array devices A, B and C, whose mirror apertures in the direction of array (or the direction of picture element shifting) were 50%, 75% and 100%, respectively. MTF was detected for each case. The mirror array devices A, B and C were as shown in FIGS. 10A to 10C. The mirror array devices A and B were prepared by forming an antireflective mask on mirror array devices the same as the mirror array device C, whose mirror aperture was 100%, so that the mirror apertures became 50% and 75%, respectively.

Though the mirror apertures normal to the direction of array were not of particular importance in this analysis, the mirror apertures normal to the direction of array were made equal to those in the direction of array, and accordingly, the two-dimensional mirror apertures of the mirror array devices A, B and C were about 25%, 56% and 100%, respectively.

As can be seen from FIG. 9, as the spatial frequency to be transmitted increases, the MTF values reduce, and the degree of reduction in the MTF values becomes larger as the mirror aperture increases.

Generally, response not less than 30% is considered to be necessary for spatial frequencies of up to about 5 line-pairs/mm in image-wise exposure of a photograph level gradation image. When judged on the basis of FIG. 9, this requirement can be satisfied by making the mirror aperture in one direction not larger than 75%.

The reason why the sharpness of the image formed on the photosensitive material deteriorates when the mirror aperture is large is that the exposure dots are so large that the exposure dots formed by one exposure overlap those formed by the next exposure. Considering the size of the exposure dots, the size of the exposure dots is 1.5 times as large as the dot pitches with blur neglected when the mirror aperture is 75%. Accordingly when the size of the exposure dots is not larger than 1.5 times the dot pitches, spatial frequencies of up to about 5 line-pairs/mm can be transmitted with response not less than 30%.

Assuming that the mirror pitches in the direction of the picture element shifting is a and the times by which the number of exposure dots are multiplied by the picture element shifting in the direction is m, the size of the exposure dots becomes equal to the dot pitches when the effective aperture of the small mirrors is a/m. Accordingly when the effective aperture of each small mirror is limited to a continuous region not longer than 1.5 a/m as measured in a direction in which the picture element shifting operation is carried out, the size of the exposure dots becomes not larger than 1.5 times the dot pitches, whereby spatial frequencies of up to about 5 line-pairs/mm can be transmitted with response not less than 30%. The discussion described above can be applied to the liquid crystal panel.

In the image-wise exposure apparatuses in accordance with the first and fourth aspects of the present invention, the effective aperture of each small mirror or each liquid crystal cell is limited to a continuous region not longer than 1.5 a/m, as measured in a direction in which the picture element shifting operation is carried out, by providing an antireflective mask. Thus spatial frequencies of up to about 5 line-pairs/mm can be transmitted with response not less than 30% and an image excellent in sharpness can be formed on the photosensitive material.

In the image-wise exposure apparatuses in accordance with the second and fifth aspects of the present invention, the effective aperture of each small mirror or each liquid crystal cell is limited to a continuous region not longer than 1.5 a/m, as measured in a direction in which the picture element shifting operation is carried out, by controlling distribution of the reflectance of each small mirror or the reflectance or transmittance of each liquid crystal cell. Thus spatial frequencies of up to about 5 line-pairs/mm can be transmitted with response not less than 30% and an image excellent in sharpness can be formed on the photosensitive material.

In the image-wise exposure apparatus in accordance with the third aspect of the present invention, the effective aperture of each small mirror or each liquid crystal cell is limited to a continuous region not longer than 1.5 a/m, as measured in a direction in which the picture element shifting operation is carried out, by chamfering each small mirror. Thus spatial frequencies of up to about 5 line-pairs/mm can be transmitted with response not less than 30% and an image excellent in sharpness can be formed on the photosensitive material.

The size of the exposure dots becomes equal to the dot pitches when the effective aperture of the small mirrors is a/m as described above. When the effective aperture of the small mirrors is smaller than a/m, gaps are formed between the exposure dots and the density of the image formed on the photosensitive material becomes unsatisfactory.

Accordingly it is preferred that the continuous region be not shorter than a/m.

Further when the size of each of the small mirrors is sufficiently close to the mirror pitches in both the directions in which the small mirrors are arrayed, the aforesaid problem of deterioration in the extinction ratio due to scattered light can be avoided.

DESCRIPTION OF THE PREFERRED EMBODIMENT

Figure 1:
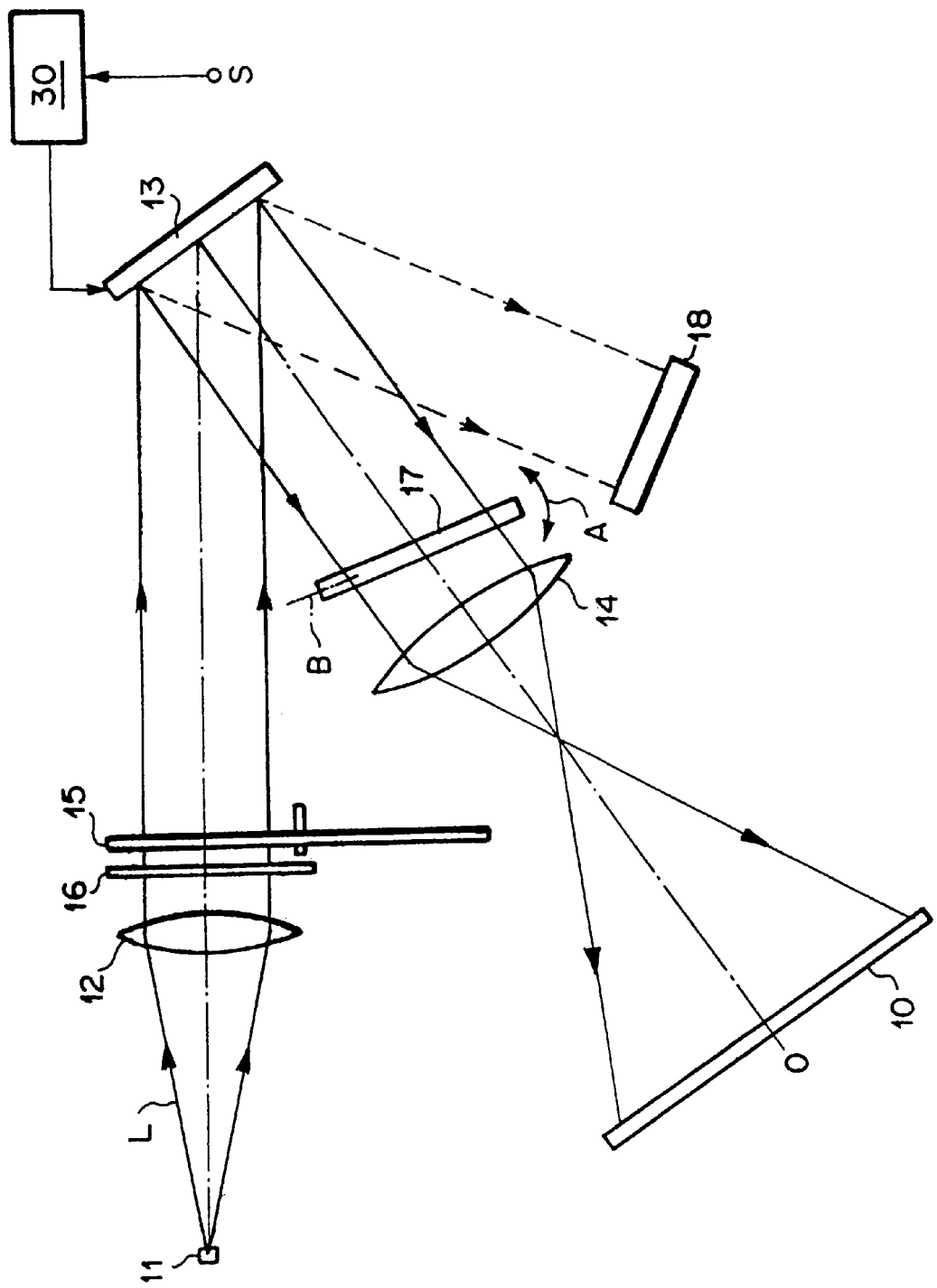
FIG. 1 is a plan view showing an image-wise exposure apparatus in accordance with a first embodiment of the present invention.

In FIG. 1, an image-wise exposure apparatus in accordance with a first embodiment of the present invention comprises a light source 11 such as a halogen lamp which emits white recording light L to which a color photosensitive material 10 is to be exposed and a converging lens 12 which is located so that the light source 10 is in the vicinity of the focal point of the converging lens 12. The converging lens 12 collimates the recording light L from the light source 10. The image-wise exposure apparatus further comprises a mirror array device 13 positioned so that the collimated recording light L impinges upon the mirror array device 13, an image forming lens 14 positioned so that the recording light L reflected by the mirror array device 13 enters the image forming lens 14 and a color filter 15 and a black shutter 16 which are inserted into the optical path of the recording light L upstream of the mirror array device 13.

A plane-parallel plate 17 for carrying out a picture element shifting is disposed between the mirror array device 13 and the image forming lens 14. The plane-parallel plate 17 is rotated in directions shown by double headed arrow A in FIG. 1 and about a rotational axis B by a rotary mechanism not shown. A light absorbing member 18 is disposed outside the optical path of the recording light L between the mirror array device 13 and the image forming lens 14.

Figure 2:
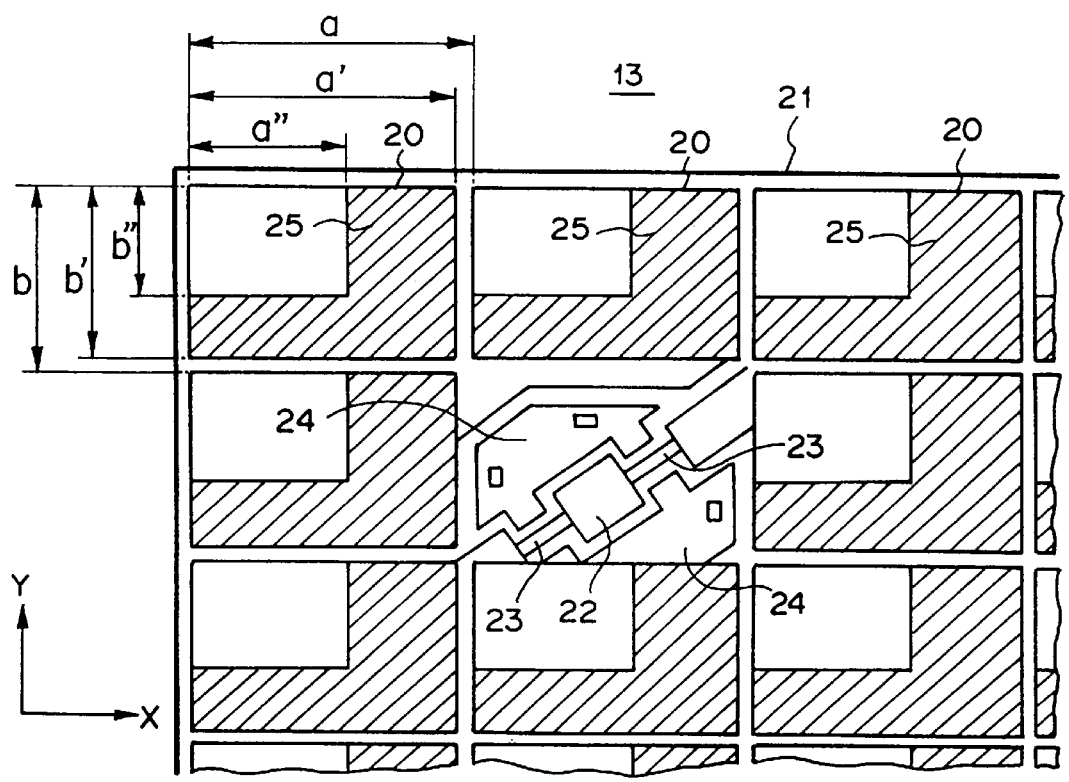
FIG. 2 is a front view partly cutaway of a mirror array device employed in the image-wise exposure apparatus.

As shown in FIG. 2, the mirror array device 13 comprises a plurality of small mirrors 20 two-dimensionally arranged (in X- and Y-directions normal to each other) on a silicone substrate 21. Each small mirror 20 is of aluminum alloy or the like and rectangular in shape. The small mirrors 20 are arranged at pitches a, e.g., 17 $\mu$m, in the X-direction and at pitches b, e.g., 17 $\mu$m, in the Y-direction. The size a' of each of the small mirrors 20 as measured in the X-direction and the size b' of each of the small mirrors 20 as measured in the Y-direction are sufficiently close respectively to the mirror pitches a and b in the X- and Y-directions and are 16 $\mu$m.

In FIG. 2, a small mirror 20 at the center is removed to show a drive mechanism for the small mirror 20. Each of the small mirrors 20 in the mirror array device 13 is provided with such a drive mechanism. As shown in FIG. 2, the drive mechanism comprises a yore 22 which supports the small mirror 20 by way of a support pin (not shown), a pair of torsion hinges 23 which support the yore 22, a pair of address electrodes 24 and a bias bus (not shown) disposed below these elements. The orientation of the torsion hinges 23 is changed by electrostatic force produced by an electric voltage applied to the address electrodes 24. Each of the small mirrors 20 is provided with an antireflective mask 25 for limiting the effective aperture of the small mirror 20 as will be described in detail later.

Voltage application to the address electrodes 24 for each small mirror 20 is controlled by a control circuit 30 (FIG. 1) which receives an image signal representing a gradation image. That is, when no voltage is applied to 10 the electrodes 24, the hinges 23 (accordingly the small mirror 20) is held in parallel to the substrate 21. When an electric voltage of a predetermined polarity is applied to one of the electrodes 24 and a complementary voltage of the reverse polarity is applied to the other electrode 24, the small mirror 20 is inclined by angle $-\theta$ relative to the substrate surface as shown in FIG. 3, and when the reverse voltages are applied to the electrodes 24, the small mirror 20 is inclined by angle $\theta$ relative to the substrate surface as shown in FIG. 4.

Figure 3:
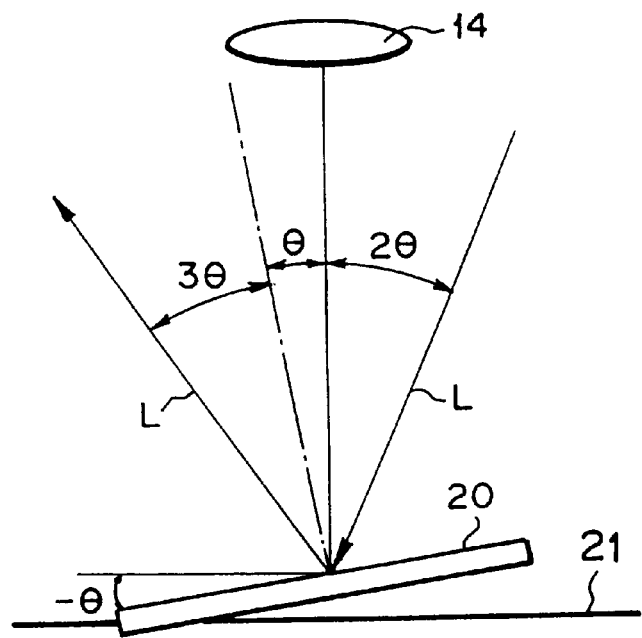
FIG. 3 is a side view showing a state of a small mirror in the mirror array device.
Figure 4:
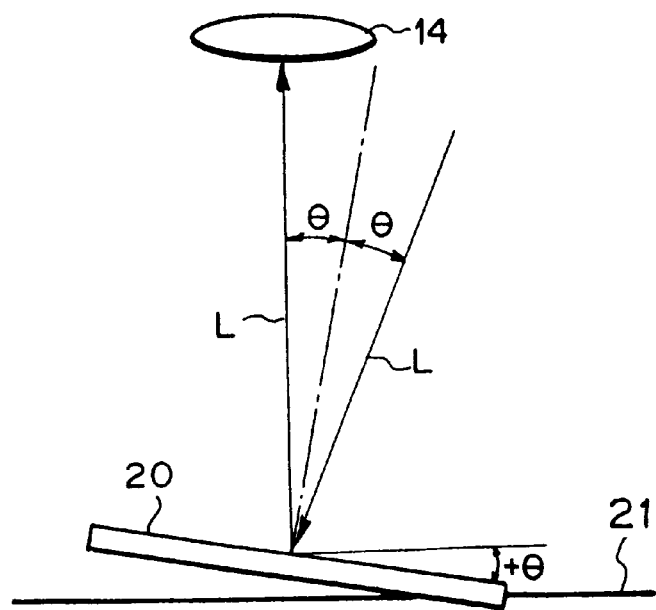
FIG. 4 is a side view showing another state of a small mirror in the mirror array device.

When the small mirror 20 is in the position shown in FIG. 3, the recording light L reflected by the small mirror 20 cannot enter the image forming lens 14 and when the small mirror 20 is in the position shown in FIG. 4, the recording light L reflected by the small mirror 20 enters the image forming lens 14 and impinges upon the photosensitive material 10. Thus whether the recording light L impinges upon the photosensitive material 10 can be controlled, small mirror by small mirror. The state of the small mirror 20 shown in FIG. 3 will be referred to as the "OFF state" and that shown in FIG. 4 will be referred to as the "ON state", hereinbelow. By controlling the ON time of each small mirror 20 (the time for which the small mirror 20 is in the ON state) according to an image signal S, for instance, by pulse width modulation, the amount of the recording light L impinging upon the photosensitive material 10 is controlled for each small mirror 20, whereby a gradation image is formed on the photosensitive material 10.

In FIGS. 3 and 4, the image forming lens 14 is shown only for the purpose of showing the angular position of the small mirror 20 relative to the image forming lens 14 and the size and position of the image forming lens 14 are different from the actual size and position. (The same in FIGS. 7 and 8 to be described later)

The color filter 15 comprises red, green and blue filters. The red, green and blue filters are inserted into the optical path of the recording light L in sequence. While one of the filters is in the optical path of the recording light L, the mirror array device 13 is driven according to the color image signal corresponding to the color of the inserted filter. While the filter is switched, all the small mirrors 20 are kept in the OFF state. Thus the color photosensitive material 10 is sequentially exposed to the modulated red, green and blue lights, whereby a color latent image is recorded on the color photosensitive material 10.

The recording light L reflected by the small mirrors 20 in the OFF state is absorbed by the light absorbing member 18. Since the size $a'$ of each of the small mirrors 20 as measured in the X-direction and the size $b'$ of each of the small mirrors 20 as measured in the Y-direction are sufficiently close, respectively, to the mirror pitches $a$ and $b$ in X- and Y-directions as described above, the aforesaid problem of deterioration in the extinction ratio due to scattered light can be avoided.

Figure 5A:
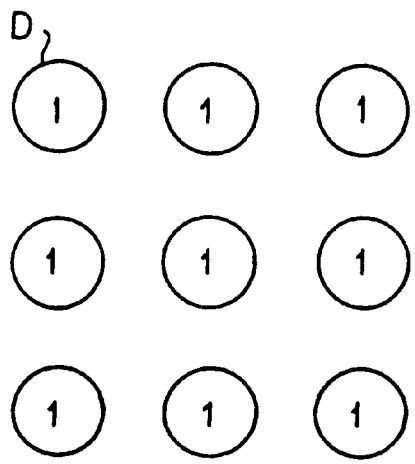
FIGS. 5A to 5D are views for illustrating how picture element shifting is carried out.

The picture element shifting will be described, hereinbelow. While one of the red, green and blue filters is in the optical path of the recording light L, the plane-parallel plate 17 is set to four different orientations. Each time the plane-parallel plate 17 is set to one of the four different orientations, image-wise exposure is carried out according to the color image signal corresponding to the color of the filter in the optical path of the recording light L. That is, for example, while the red filter is in the optical path of the recording light L, the plane-parallel plate 17 is kept in a first position and the mirror array device 13 is driven in this state. At this time, the mirror array device 13 is driven according to the red image signal, which represents the picture elements at odd-numbered rows and odd-numbered columns in the array of picture elements of the image to be formed. As a result, exposure dots D indicated at "1" are recorded on the color photosensitive material 10 as shown in FIG. 5A. In FIGS. 5A to 5D, the shape of the exposure dots D is schematically shown as a circle.

Figure 5B:
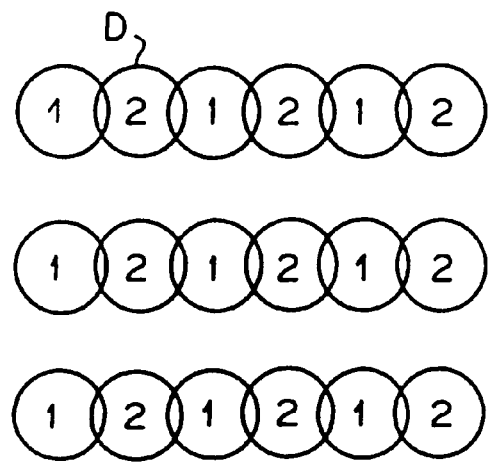

Then the plane-parallel plate 17 is swung by a predetermined angle in one of the directions shown by the double headed arrow A in FIG. 1 to be located in a second position and the mirror array device 13 is driven in this state. At this time, the mirror array device 13 is driven according to the red image signal, which represents the picture elements at odd-numbered rows and even-numbered columns in the array of picture elements of the image to be formed. As a result, exposure dots D indicated at "2" in FIG. 5B are recorded on the color photosensitive material 10.

Figure 5C:
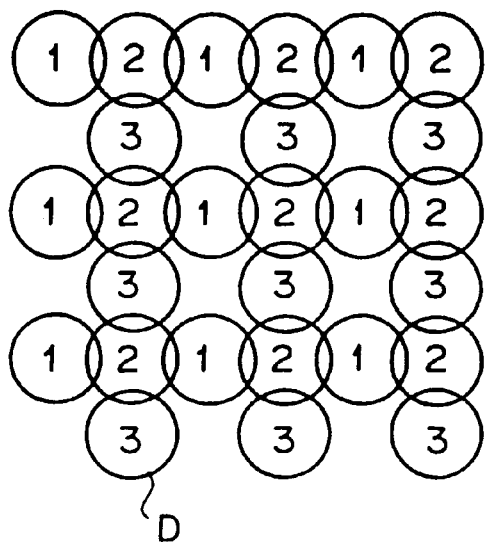

Then the plane-parallel plate 17 is swung by a predetermined angle about the axis B shown in FIG. 1 to be located in a third position and the mirror array device 13 is driven in this state. At this time, the mirror array device 13 is driven according to the red image signal, which represents the picture elements at even-numbered rows and even-numbered columns in the array of picture elements of the image to be formed. As a result, exposure dots D indicated at "3" in FIG. 5C are recorded on the color photosensitive material 10.

Figure 5D:
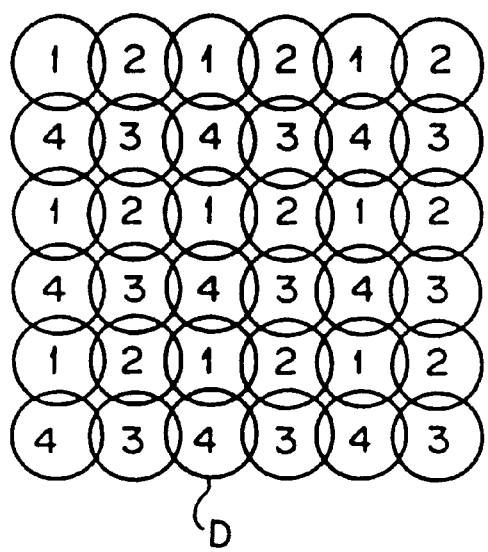

Then the plane-parallel plate 17 is swung by a predetermined angle in the reverse direction (i.e., the direction reverse to the direction in which the plane-parallel plate 17 was swung from the first position to the second position) to be located in a fourth position and the mirror array device 13 is driven in this state. At this time, the mirror array device 13 is driven according to the red image signal, which represents the picture elements at even-numbered rows and odd-numbered columns in the array of picture elements of the image to be formed. As a result, exposure dots D indicated at "4" in FIG. 5D are recorded on the color photosensitive material 10. Thereafter while the green filter is inserted into the optical path of the recording light L, the plane-parallel plate 17 is returned to the first position.

In the manner described above, picture element shifting is carried out once in each of X- and Y-directions and accordingly, exposure dots D which are twice as large as the number of the small mirrors 20 in number are recorded on the photosensitive material 10, whereby a high resolution image can be formed on the photosensitive material 10.

The picture element shifting described above is carried out with the green filter in the optical path of the recording light L and with the blue filter in the optical path of the recording light L. Thereafter the color photosensitive material 10 is subjected to an ordinary developing process and the latent image on the photosensitive material 10 is developed into a visible image.

The mask 25 formed for each small mirror 20 will be described hereinbelow. As shown in FIG. 2, the mask 25 limits the effective aperture of each small mirror 20 to a continuous region of a length a" (=10 $\mu$m) in X-direction and of a length b" (=10 $\mu$m) in Y-direction. In this particular embodiment, the times $m$ by which the number of exposure dots are multiplied by the picture element shifting in the X-direction is 2 and the times $n$ by which the number of exposure dots are multiplied by the picture element shifting in the Y-direction is 2. Further the mirror pitches $a$ in the X-direction is 17 $\mu$m and those $b$ in the Y-direction is 17 $\mu$m. Accordingly a"<1/5 a/m and at the same time b"<1.5 b/n. Therefore an image excellent in sharpness can be formed even if picture element shifting is carried out for the reason described above.

Further in this particular embodiment, a/m=8.5 $\mu$m, b/n= 8.5 $\mu$m, a/m<a" and b/n<b". Accordingly, the aforesaid problem that gaps are formed between the exposure dots and the density of the image formed on the photosensitive material becomes unsatisfactory can be avoided.

Instead of forming a mask 25 for each small mirror 25, a single mask having a plurality of openings corresponding to the small mirrors 20 may be used in combination with the mirror array device 13. Though, in this embodiment, each small mirror 20 is exposed at an end portion thereof, each small mirror may be exposed at the center thereof.

The technique of limiting the effective aperture may also be applied to an image-wise exposure apparatus in which a liquid crystal panel is used as the spatial modulation device in order to prevent deterioration in sharpness due to picture element shifting.

A second embodiment of the present invention will be described, hereinbelow. The image-wise exposure apparatus of the second embodiment is substantially the same as that of the first embodiment except the structure of the small mirror.

Figure 6:
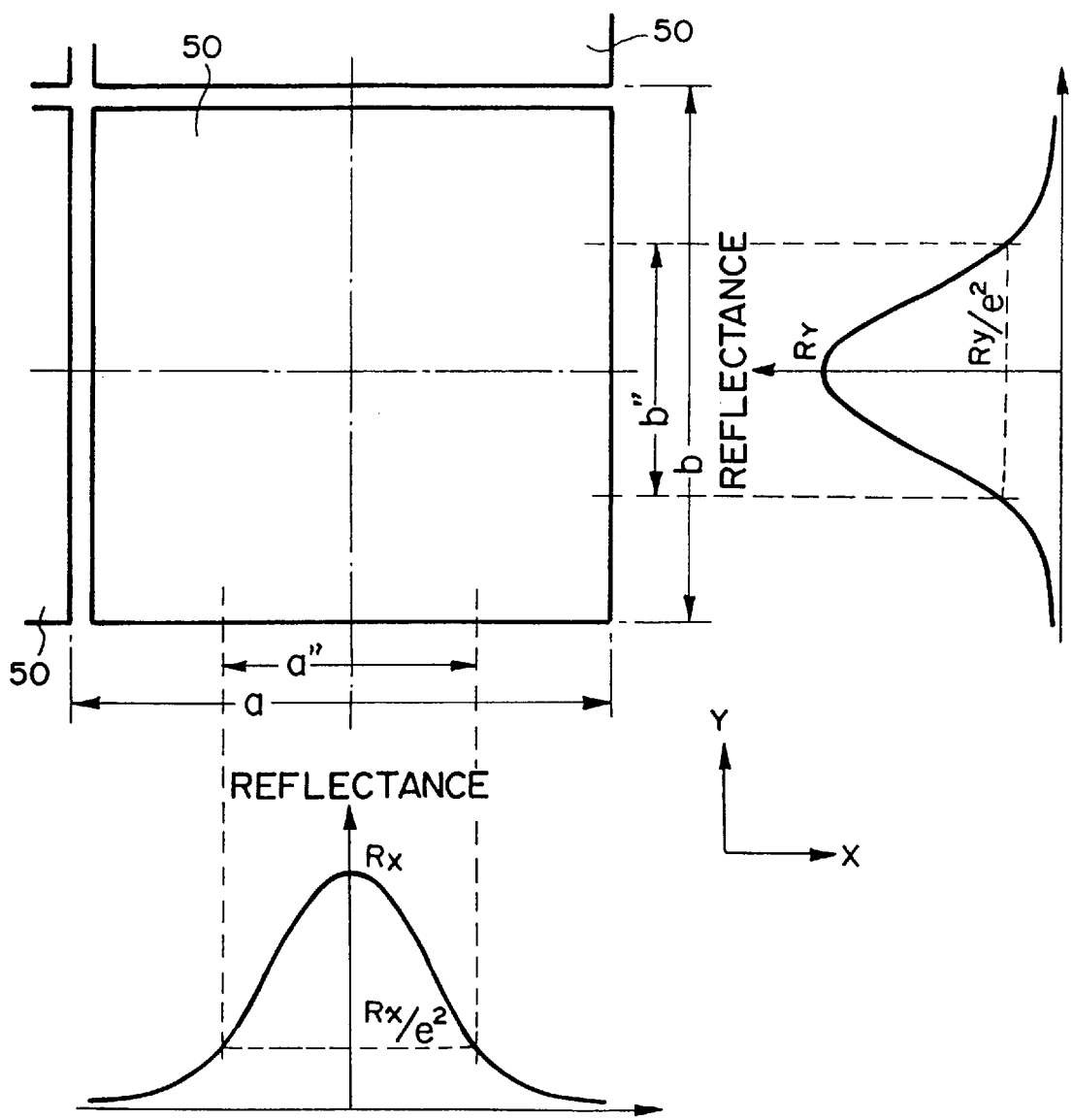
FIG. 6 is a schematic view showing the shape of a small mirror in a mirror array device employed in an image-wise exposure apparatus in accordance with a second embodiment of the present invention and the reflectance distribution on the small mirror.

FIG. 6 shows the shape of the small mirror 50 and the reflectance distribution thereon. As shown in FIG. 6, the reflectance of each small mirror 50 shows Gaussian distribution where the reflectance is maximized substantially at the center of the small mirror 50 in both X- and Y-directions. When the maximum reflectances in the X- and Y-directions are respectively represented by $R_X$ and $R_Y$, the reflectance is not lower than $R_X/e^2$ only in a continuous region of a length a" (=10 $\mu$m) in the X-direction and is not lower than $R_Y/e^2$ only in a continuous region of a length b" (=10 $\mu$m) in the Y-direction. Further the mirror pitches $\underline{a}$ in the X-direction is 17 $\mu$m and those $\underline{b}$ in the Y-direction is 17 $\mu$m.

The recording light L reflected by the portion of the small mirror 50 at which the reflectance is lower than $R_X/e^2$ in the X-direction and that reflected by the portion of the small mirror 50 at which the reflectance is lower than $R_Y/e^2$ in the Y-direction are too weak to form an image on the photosensitive material 10. That is, the effective aperture of the small mirror 50 is limited to length a" and b" in the X- and Y-directions respectively.

Also in this embodiment when the times $\underline{m}$ by which the number of exposure dots are multiplied by the picture element shifting in the X-direction is 2 and the times $\underline{n}$ by which the number of exposure dots are multiplied by the picture element shifting in the Y-direction is 2, a"<1.5 a/m and at the same time b"<1.5 b/n. Therefore an image excellent in sharpness can be formed even if picture element shifting is carried out for the reason described above.

Further also in this embodiment, since the size of each of the small mirrors 50 is sufficiently close to the mirror pitches in both the X- and Y-directions, the aforesaid problem that gaps are formed between the exposure dots and the density of the image formed on the photosensitive material becomes unsatisfactory can be avoided.

The reflectance distribution of the small mirror may be other than Gaussian distribution. For example, the reflectance distribution on the small mirror may be such that the reflectance is substantially uniform and high in a continuous region of a length a" in the X-direction and in a continuous region of a length b" in the Y-direction and is substantially uniform and very low outside the region.

A third embodiment of the present invention will be described, hereinbelow. The image-wise exposure apparatus of the third embodiment is substantially the same as that of the first embodiment except the structure of the small mirror.

Figure 7:
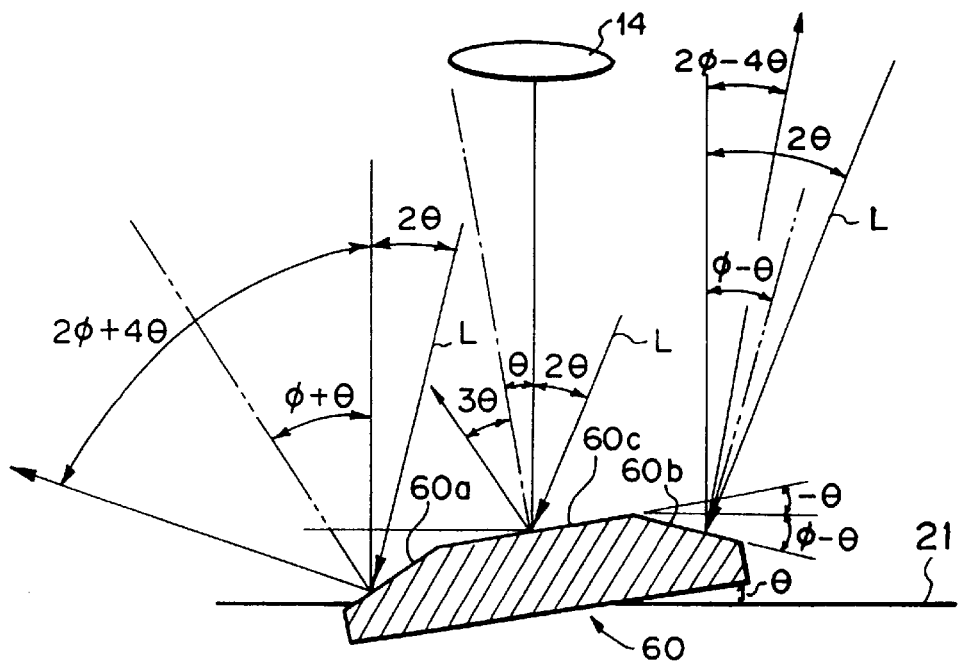
FIG. 7 is a side view showing a state of a small mirror in a mirror array device employed in an image-wise exposure apparatus in accordance with a third embodiment of the present invention.
Figure 8:
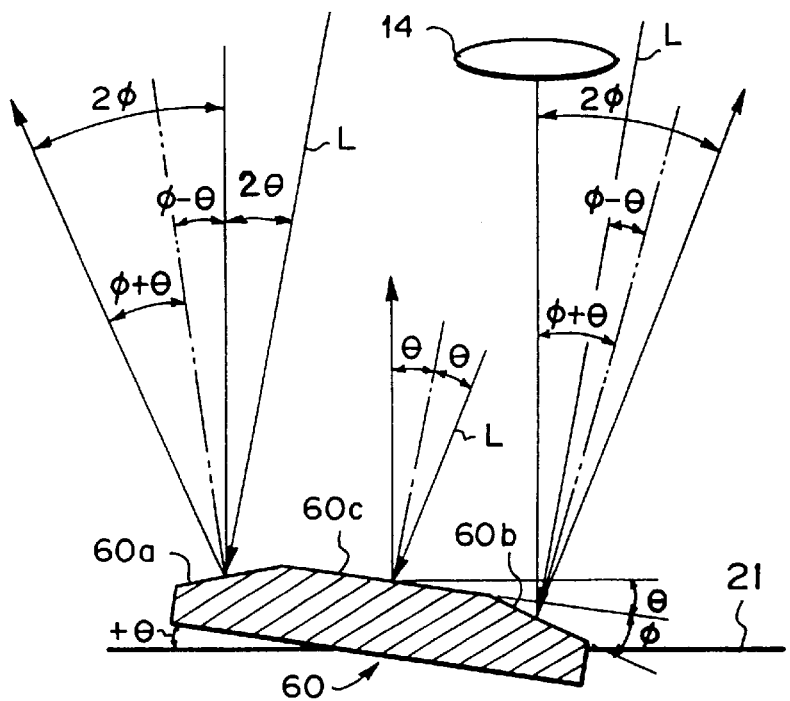
FIG. 8 is a side view showing another state of a small mirror in the mirror array device.
Figure 9:
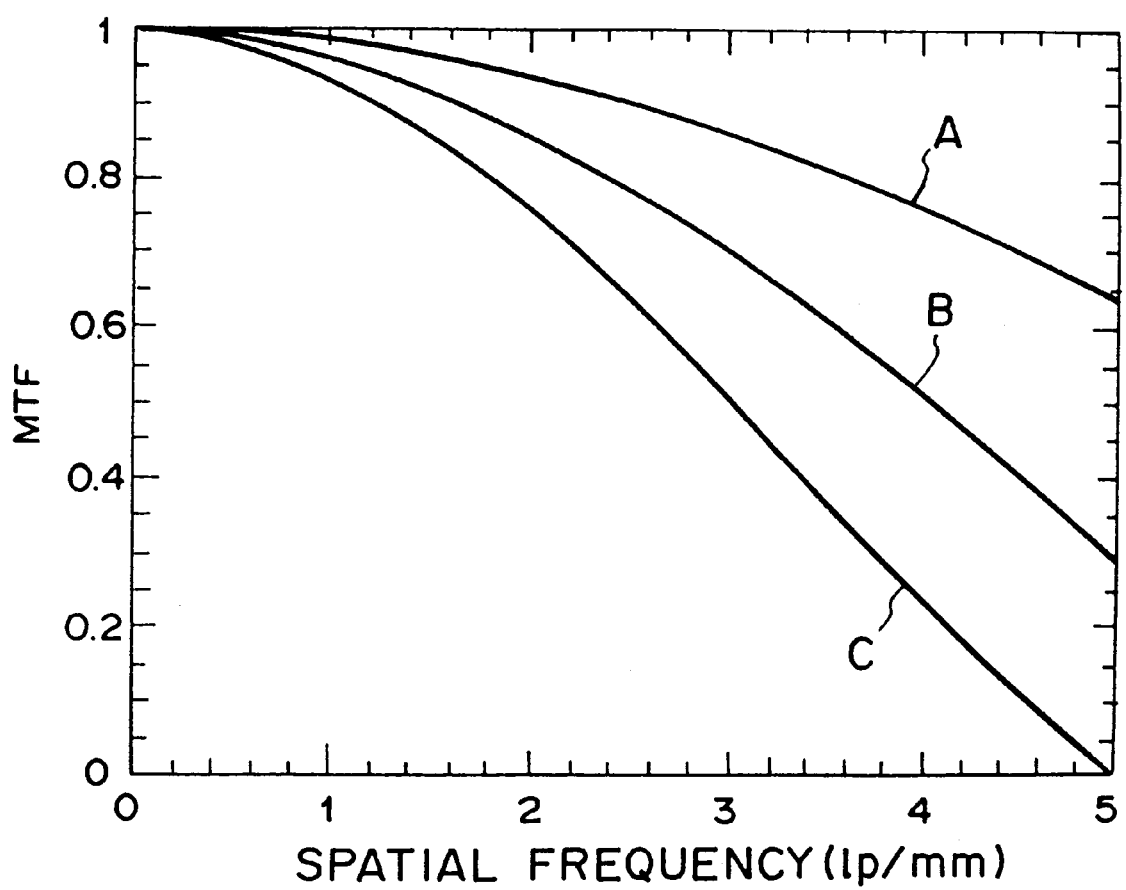
FIG. 9 is a graph showing the relation ship between the aperture of a small mirror in a mirror array device and MTF.
Figure 10A:
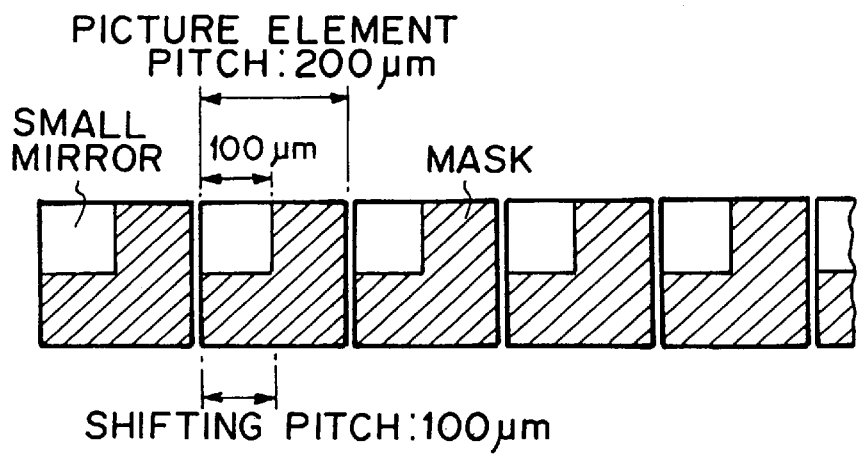
FIGS. 10A to 10C are front views respectively showing the small mirrors employed to obtain the relationship shown in FIG. 9.
Figure 10B:
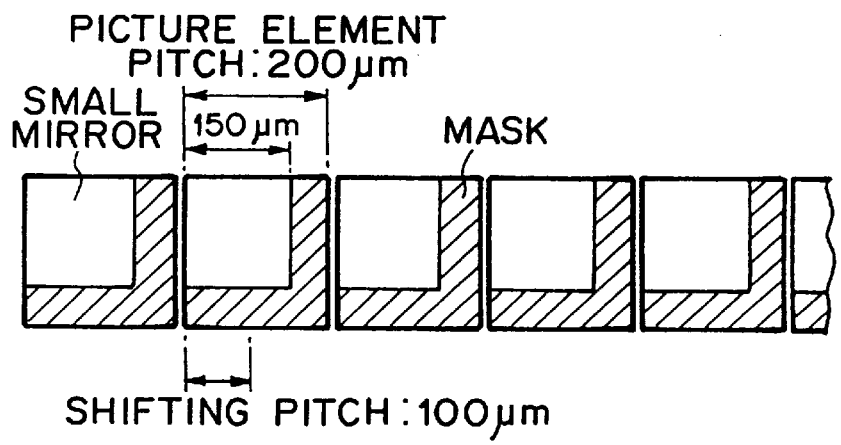
Figure 10C:
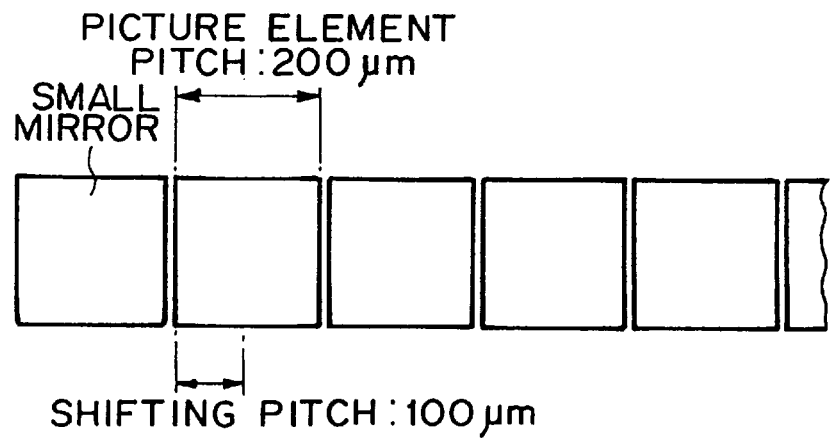

FIGS. 7 and 8 show the shape of the small mirror 60 employed in this embodiment. As shown in FIGS. 7 and 8, the small mirror 60 is chamfered along its four sides. FIG. 7 shows the OFF state of the small mirror 60 and FIG. 8 shows the ON state of the same. In FIGS. 7 and 8, a cross-sectional shape of the small mirror 60 in a plane normal to the rotational axis of the small mirror 60 is shown.

When the small mirror 60 is in the OFF state (in the position shown in FIG. 7), the recording light L reflected by the mirror surface 60c of the small mirror 60 between the chamfered portions 60a and 60b cannot enter the image forming lens 14 and when the small mirror 60 is in the ON state (in the position shown in FIG. 8), the recording light L reflected by the mirror surface 60c of the small mirror 60 enters the image forming lens 14 and impinges upon the photosensitive material 10.

The recording light L reflected by the chamfered portions 60a and 60b never enters the image forming lens 14 and never impinges upon the photosensitive material 10 irrespective of the position of the small mirror 60. Thus also in this embodiment, the effective aperture of the small mirror 60 is limited to the mirror surface 60c. Accordingly, when the length of the mirror surface 60c in the X-direction is not larger than 1.5 a/m and that in the Y-direction is not larger than 1.5 b/n, an image excellent in sharpness can be formed even if picture element shifting is carried out.

The range of the angle of chamfer $\phi$ (the angle projected on a plane normal to the rotational axis of the small mirror 60) will be described, hereinbelow. When the small mirror 60 is in the OFF state, the recording light L reflected by the chamfered portion 60a naturally does not enter the image forming lens 14 since the recording light L reflected by the mirror surface 60c cannot enter the image forming lens 14. Accordingly, in this case, it suffices to set the angle of chamfer $\phi$ so that the recording light L reflected by the chamfered portion 60b does not enter the image forming lens 14. As can be seen from FIG. 7, the recording light L reflected by the chamfered portion 60b travels in a direction at an angle (2$\phi$−4$\theta$) to the normal of the substrate surface. Assuming that the recording light L reflected at an angle not larger than $\alpha$ to the normal of the substrate surface enters the image forming lens 14, $\alpha$ should be smaller than (2$\phi$−4$\theta$) in order to prevent the recording light L reflected by the chamfered portion 60b from entering the image forming lens 14. That is, $\phi$ should be larger than $\alpha/2+2\phi$.

On the other hand, when the small mirror 60 is in the ON state, the recording lights L reflected by the chamfered portions 60a and 60b both travel in a direction at an angle 2$\theta$ to the normal of the substrate surface as can be seen from FIG. 8. Accordingly when $\alpha<2\phi$ or $\phi>\alpha/2$, the recording lights L reflected by the chamfered portions 60a and 60b cannot enter the image forming lens 14.

Thus when $\phi>\alpha/2+2\theta$, the recording light L reflected by the chamfered portions 60a and 60b never enters the image forming lens 14 and never impinges upon the photosensitive material 10 irrespective of the position of the small mirror 60.

Though, in the embodiments described above, picture element shifting is carried out in the directions of arrays of the small mirrors, the present invention can also be applied to the case where picture element shifting is carried out in a direction at an angle to the directions of arrays of the small mirrors.

What is claimed is:

1. An image-wise exposure apparatus comprising:
   a light source for emitting recording light to which a photosensitive material is exposed,
   a mirror array device comprising:
   a plurality of small mirrors which are two-dimensionally arrayed in two directions normal to each other in positions where the small mirrors receive the recording light, and
   a drive mechanism for changing orientations of the respective small mirrors independently from each other so that the recording light impinging upon each of the small mirrors is reflected selectively in one of a first direction in which the reflected light impinges upon the photosensitive material, and a second direction in which the reflected light does not impinge upon the photosensitive material, a control circuit which controls the drive mechanism according to an image signal, and means for shifting a picture element which changes an optical relationship between the mirror array device and the photosensitive material to a second relationship after exposure of the photosensitive material to the recording light from the small mirrors with the mirror array device and the photosensitive material in a first relationships so that exposure dots are formed by exposure of the photosensitive material to the recording light from the small mirrors with the mirror array device and the photosensitive material in the second relationship, between adjacent exposure dots formed by exposure of the photosensitive material to the recording light from the small mirrors with the mirror array device and the photosensitive material in the first relationship, wherein the size of each of the small mirrors is smaller than mirror pitches in both the directions in which the small mirrors are arrayed, and said exposure apparatus further comprises:

an antireflective mask disposed on each of the small mirrors, said mask which one of absorbs and scatters light, and said mask limiting an effective aperture of each of the small mirrors to a continuous region not longer than 1.5 a/m as measured in a direction in which picture element shifting is carried out by said picture element shifting means, wherein a represents the mirror pitches in a direction of the picture element shifting and m represents a number of times by which a number of exposure dots are multiplied by the picture element shifting in the direction of the picture element shifting.

2. An image-wise exposure apparatus as defined in claim 1 in which said continuous region is not shorter than a/m.

3. An image-wise exposure apparatus as defined in claim 1 or 2 in which said picture element shifting means carries out the picture element shifting in both the directions in which the small mirrors are arrayed and which are normal to each other.

4. An image-wise exposure apparatus comprising:

a light source for emitting recording light to which a photosensitive material is exposed, a liquid crystal panel comprising:

a plurality of liquid crystal cells which are two-dimensionally arrayed in two directions in positions where the liquid crystal cells receive the recording light, and a drive mechanism which drives the liquid crystal cells independently from each other to change one of a transmittance and a reflectance of each of the liquid crystal cells, thereby controlling impingement of the recording light upon the photosensitive material, a control circuit which controls the drive mechanism according to an image signal, and means for shifting a picture element which changes an optical relationship between the liquid crystal panel and the photosensitive material to a second relationship after exposure of the photosensitive material to the recording light from the liquid crystal cells with the liquid crystal panel and the photosensitive material in a first relationship, so that exposure dots are formed by exposure of the photosensitive material to the recording light from the liquid crystal cells with the liquid crystal panel and the photosensitive material in the second relationship, between adjacent exposure dots formed by exposure of the photosensitive material to the recording light from the liquid crystal cells with the liquid crystal panel and the photosensitive material in the first relationship, wherein said exposure apparatus further comprises:

an antireflective mask disposed on each of the liquid crystal cells on the liquid crystal panel, said mask which one of absorbs and scatters light said mask limiting an effective aperture of each of the liquid crystal cells to a continuous region not longer than 1.5 a/m as measured in a direction in which picture element shifting is carried out by said picture element shifting means, wherein a represents liquid crystal cell pitches in a direction of the picture element shifting and m represents a number of times by which a number of exposure dots are multiplied by the picture element shifting in the direction of the picture element shifting.

5. An image-wise exposure apparatus as defined in claim 4 in which said continuous region is not shorter than a/m.

6. An image-wise exposure apparatus as defined in claim 4 or 5 in which said picture element shifting means carries out the picture element shifting in both the directions in which the liquid crystal cells are arrayed and which are normal to each other.

7. A mirror array device comprising:

a plurality of small mirrors which are two-dimensionally arrayed in positions where the small mirrors receive recording light emitted from an image-wise exposure apparatus where picture element shifting is carried out by means for shifting a picture element, and a drive mechanism for changing orientations of the respective small mirrors independently from each other so that the recording light impinging upon each of the small mirrors is reflected selectively in one of a first direction in which the reflected light impinges upon the photosensitive material and a second direction in which the reflected light does not impinge upon the photosensitive material, wherein the size of each of the small mirrors is smaller than mirror pitches in both the directions in which the small mirrors are arrayed, and said mirror array device further comprises:

an antireflective mask disposed on each of the small mirrors, said mask which one of absorbs and scatters light, which limits an effective aperture of each of the small mirrors to a continuous region not longer than 1.5 a/m as measured in a direction in which picture element shifting is carried out by said picture element shifting means, wherein a represents the mirror pitches in a direction of the picture element shifting and m represents a number of times by which a number of exposure dots are multiplied by the picture element shifting in the direction of the picture element shifting.

8. A mirror array device as defined in claim 7 in which said continuous region is not shorter than a/m.

9. A liquid crystal panel comprising:

a plurality of liquid crystal cells which are two-dimensionally arrayed in two directions in positions where the liquid crystal cells receive the recording light emitted from an image-wise exposure apparatus where picture element shifting is carried out by means for shifting a picture element, and a drive mechanism which drives the liquid crystal cells independently from each other to change one of a transmittance and a reflectance of each of the liquid crystal cells, thereby controlling impingement of the recording light upon the photosensitive material, wherein said liquid crystal panel further comprises:

an antireflective mask disposed on each of the liquid crystal cells on the liquid crystal panel, said mask which one of absorbs and scatters light, said mask limiting an effective aperture of each of the liquid crystal cells to a continuous region not longer than 1.5 a/m as measured in a direction in which picture element shifting is carried out by said picture element shifting means, wherein a represents liquid crystal cell pitches in a direction of the picture element shifting and m represents a number of times by which a number of exposure dots are multiplied by the picture element shifting in the direction of the picture element shifting.

10. A liquid crystal panel as defined in claim 9 in which said continuous region is not shorter than a/m.

* * * * *